(12) United States Patent
Walker (10) Patent No.: US 12,156,314 B2
(45) Date of Patent: Nov. 26, 2024

(54) EIGHT-ZONE CONTROLLER

(71) Applicant: Vernon L. Walker, Converse, TX (US)

(72) Inventor: Vernon L. Walker, Converse, TX (US)

( * ) Notice: Subject to any disclaimer, the term of this patent is extended or adjusted under 35 U.S.C. 154(b) by 0 days.

(21) Appl. No.: 18/048,491

(22) Filed: Oct. 21, 2022

(65) Prior Publication Data

US 2024/0138042 A1 Apr. 25, 2024
US 2024/0237176 A9 Jul. 11, 2024

(51) Int. Cl.
*H05B 47/155* (2020.01)
*F21S 43/14* (2018.01)
*F21Y 115/10* (2016.01)

(52) U.S. Cl.
CPC ............ *H05B 47/155* (2020.01); *F21S 43/14* (2018.01); *F21Y 2115/10* (2016.08)

(58) Field of Classification Search
CPC ..... H05B 47/155; F21S 43/14; F21Y 2115/10
See application file for complete search history.

(56) References Cited

U.S. PATENT DOCUMENTS

| | | | | |
|---|---|---|---|---|
| 6,402,354 | B1* | 6/2002 | Tatewaki | B60Q 3/85 362/490 |
| 10,220,774 | B2* | 3/2019 | Ohashi | G02B 6/0006 |
| 2008/0191626 | A1* | 8/2008 | Salter | H05B 45/20 315/77 |
| 2014/0175993 | A1* | 6/2014 | Tischler | F21V 23/02 315/185 R |
| 2018/0054862 | A1* | 2/2018 | Takagimoto | H05B 47/20 |

* cited by examiner

*Primary Examiner* — Carlos Amaya
(74) *Attorney, Agent, or Firm* — Brandon T. Cook; Gunn, Lee & Cave, P.C.

(57) ABSTRACT

A light system for a vehicle using an eight-zone controller for controlling the lights. The eight-zone controller can maintain eight independent signal zones, or two or more zones can be grouped together. The eight-zone controller is configured with splitter hubs and second tier splitter hubs to increase the quantity of lights included in the system.

3 Claims, 17 Drawing Sheets

EIGHT-ZONE CONTROLLER

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to a device and method for controlling aftermarket lights installed on a vehicle.

2. Description of the Related Art

It is popular for vehicle owners to install aftermarket lights on a vehicle. Typically, light emitting diode (LED) lights are used.

There are various products available to configure the wiring of such lights.

BRIEF SUMMARY OF THE INVENTION

The present invention comprises a system for wiring and controlling a plurality of lights installed on a vehicle. The present invention is capable of maintaining eight independent zones. The user can control all eight-zones simultaneously, or group/ungroup one or more zones. The present invention comprises storage for up to nine different stored light shows, which can be edited in both Apple® and Android® smartphone applications, and are accessed through both smartphone applications and remote control.

The present invention uses an eight-zone controller coupled with a plurality of splitter hubs and second tier splitter hubs to simultaneously control over one-hundred LED lights. The present invention includes trigger signal wires connected to various electrical components of the vehicle such as the turn signals, brake signal, and reverse signal.

The light system described herein has a working voltage of DC10-15V and amperage of 2.5 A max for each zone and 16 A for eight zones.

DETAILED DESCRIPTION OF THE INVENTION

Figure 1:
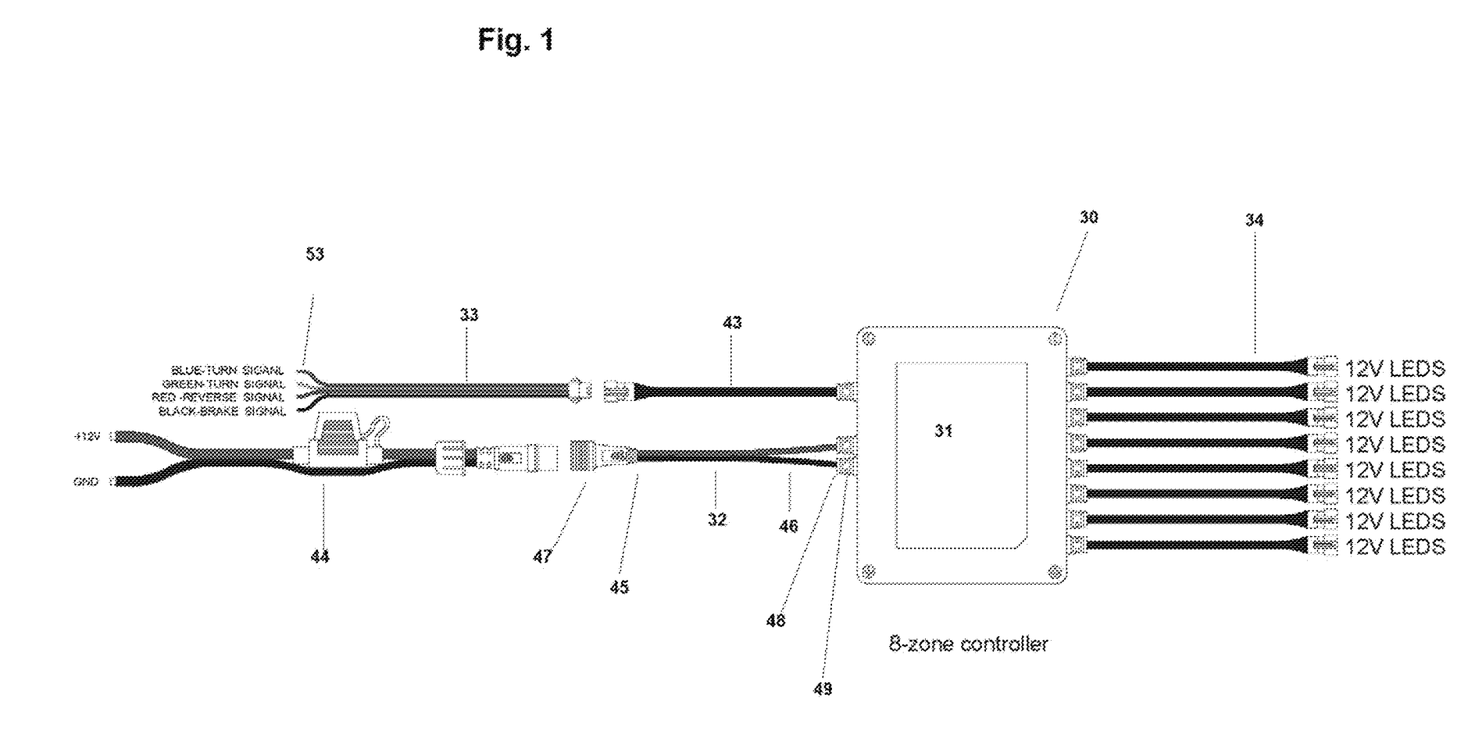
FIG. 1 a first diagram of an embodiment of the eight-zone controller.
Figure 2:
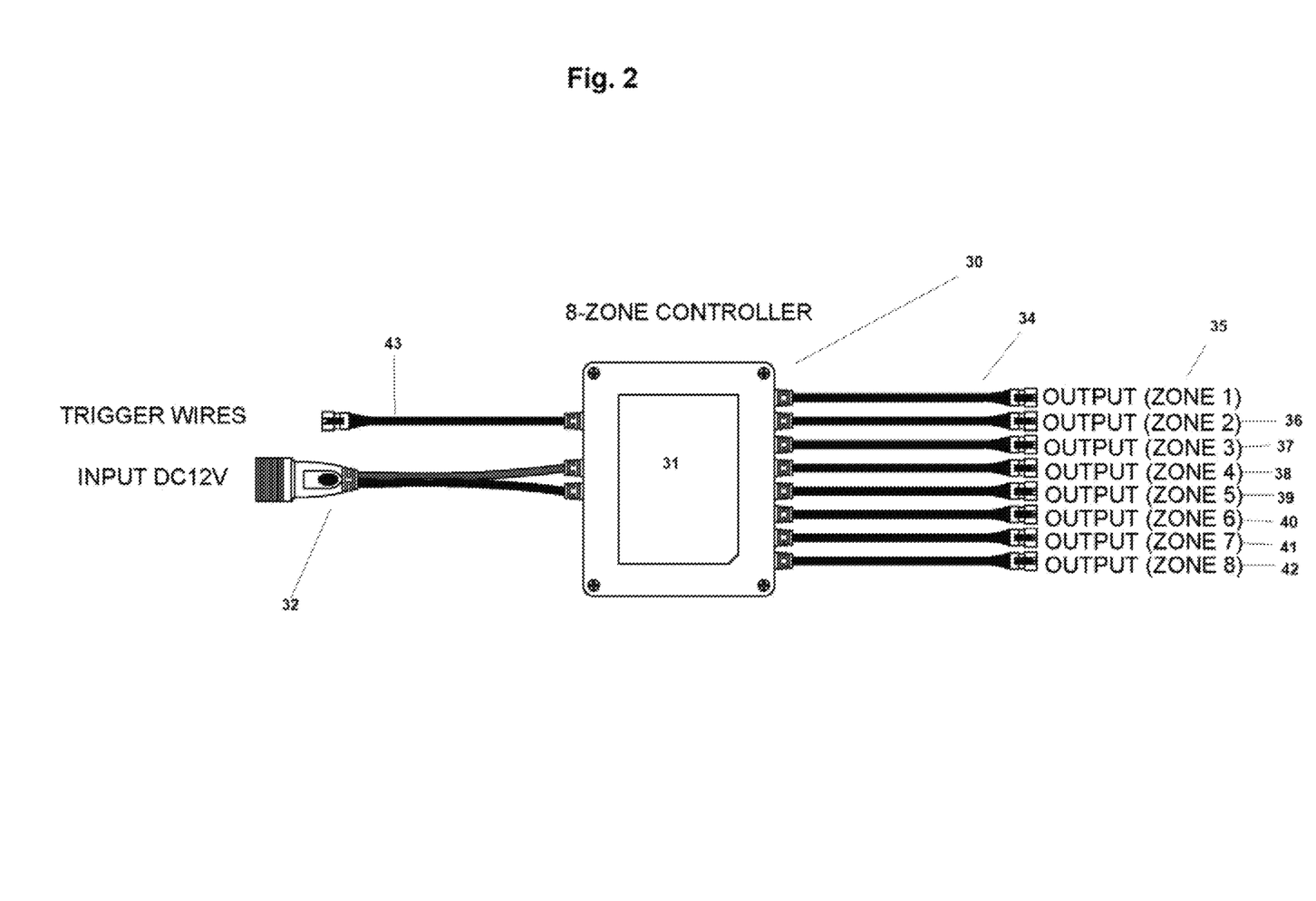
FIG. 2 is a second diagram of an embodiment of the eight-zone controller.

An embodiment of the eight-zone controller 30 is described herein. With reference to FIGS. 1 and 2, the eight-zone controller 30 comprises a housing 31, a power input 32, a trigger signal input 43, trigger wires 33, a plurality of outputs 34, and a power supply cord 44. The eight-zone controller 30 can receive optional trigger signals and output eight different output LED signals. The eight-zone controller 30 also includes a single chip microcomputer within the housing 31.

The plurality of outputs 34 further comprise zone one 35, zone two 36, zone three 37, zone four 38, zone five 39, zone six 40, zone seven 41, and zone eight 42.

The power input 32 comprises a power wire 45, a ground wire 46, a power cord coupling 47, a housing power coupling 48, and a housing ground coupling 49.

Figure 17:
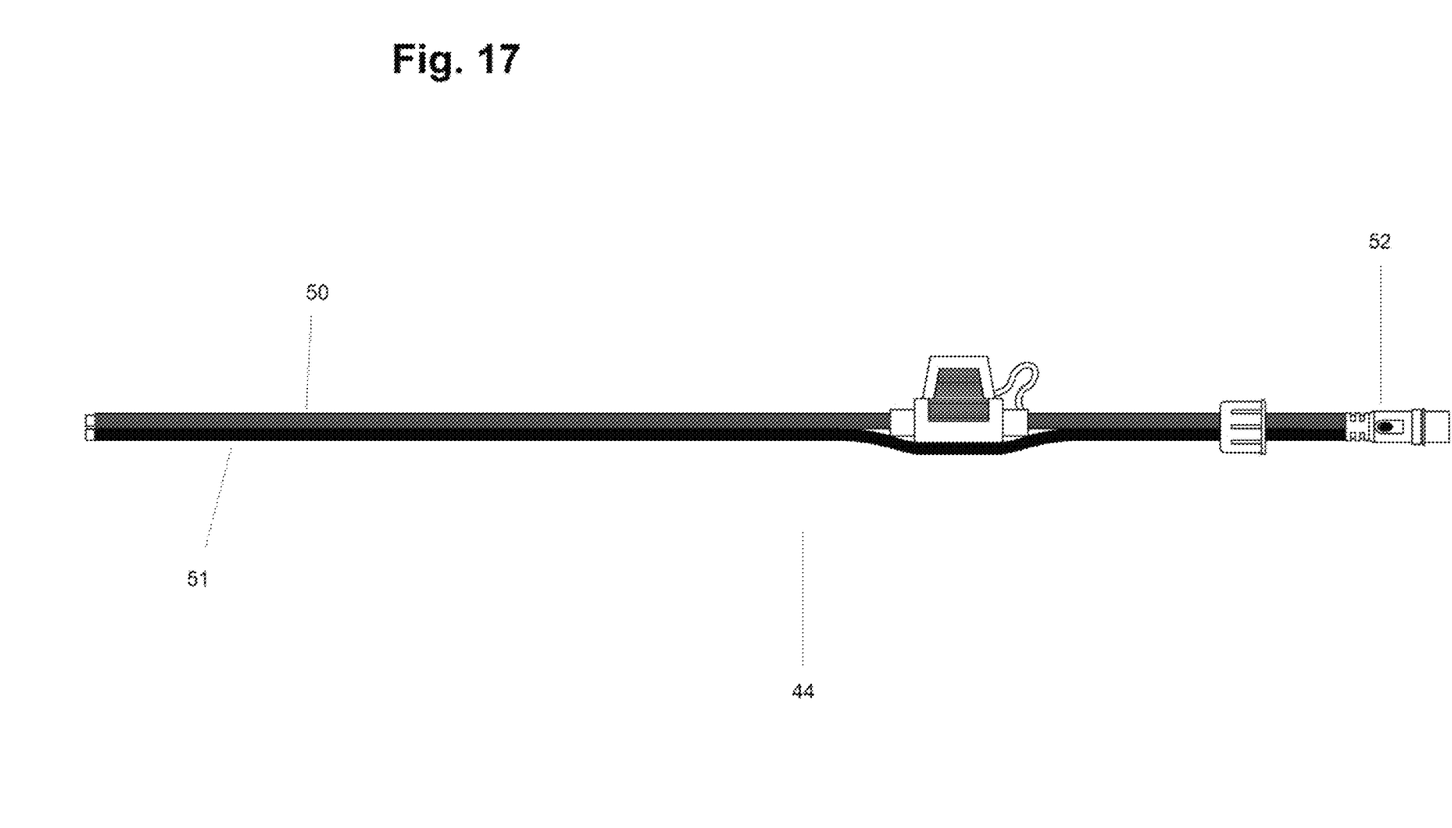
FIG. 17 is a perspective view of an embodiment of a power cord.
Figure 18:
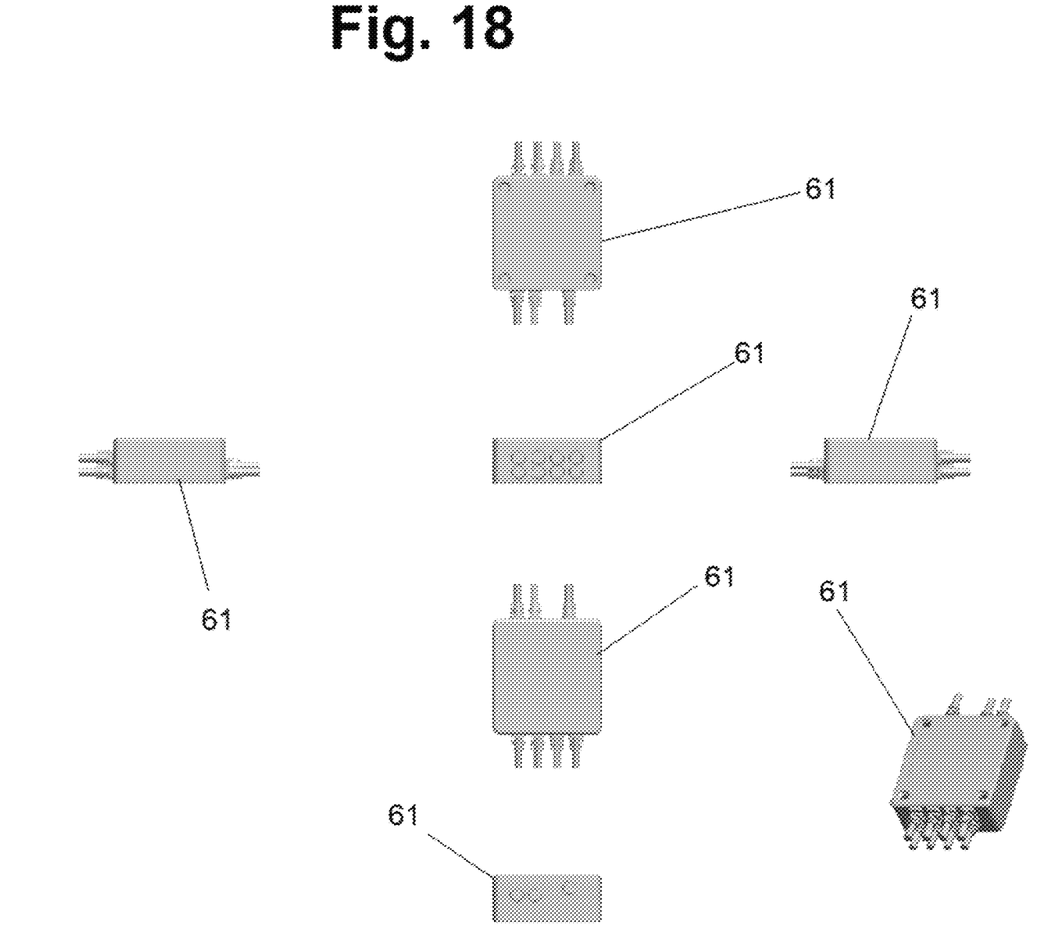
FIG. 18 is a plurality of views of an embodiment of the exterior housing for a signal splitter hub.

With reference to FIGS. 1 and 17, the power cord 44 comprises a power wire 50, a ground wire 51, and an input coupling 52. In the embodiment described herein, the power cord 44 and power wire therein 50 are designed to deliver twelve volts.

Figure 8:
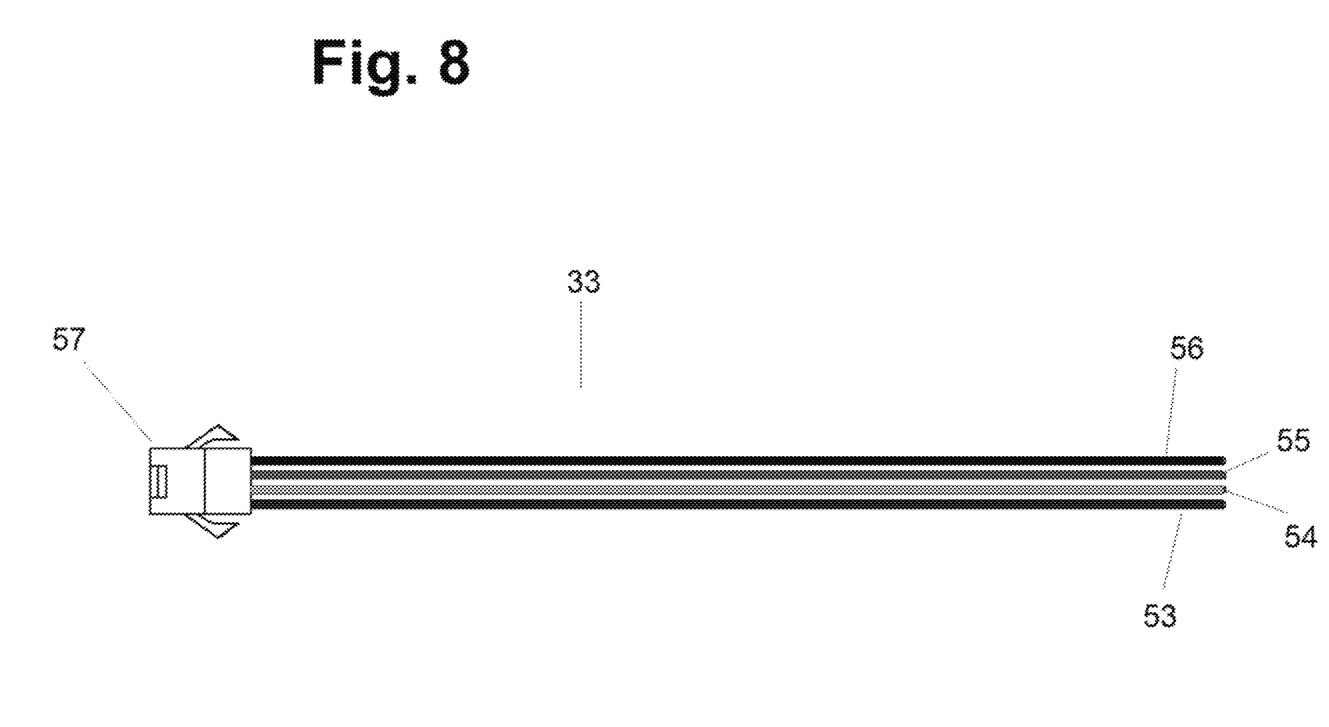
FIG. 8 is a diagram of an embodiment of trigger wires.

With reference to FIGS. 1 and 8, the trigger wires 33 further comprises a blue turn signal trigger wire 53, a green turn signal trigger wire 54, a red reverse signal trigger wire 55, and a black brake signal trigger wire 56. The trigger wires 33 also have a coupling 57. The color coding helps the user properly install the eight-zone controller 30.

Figure 10:
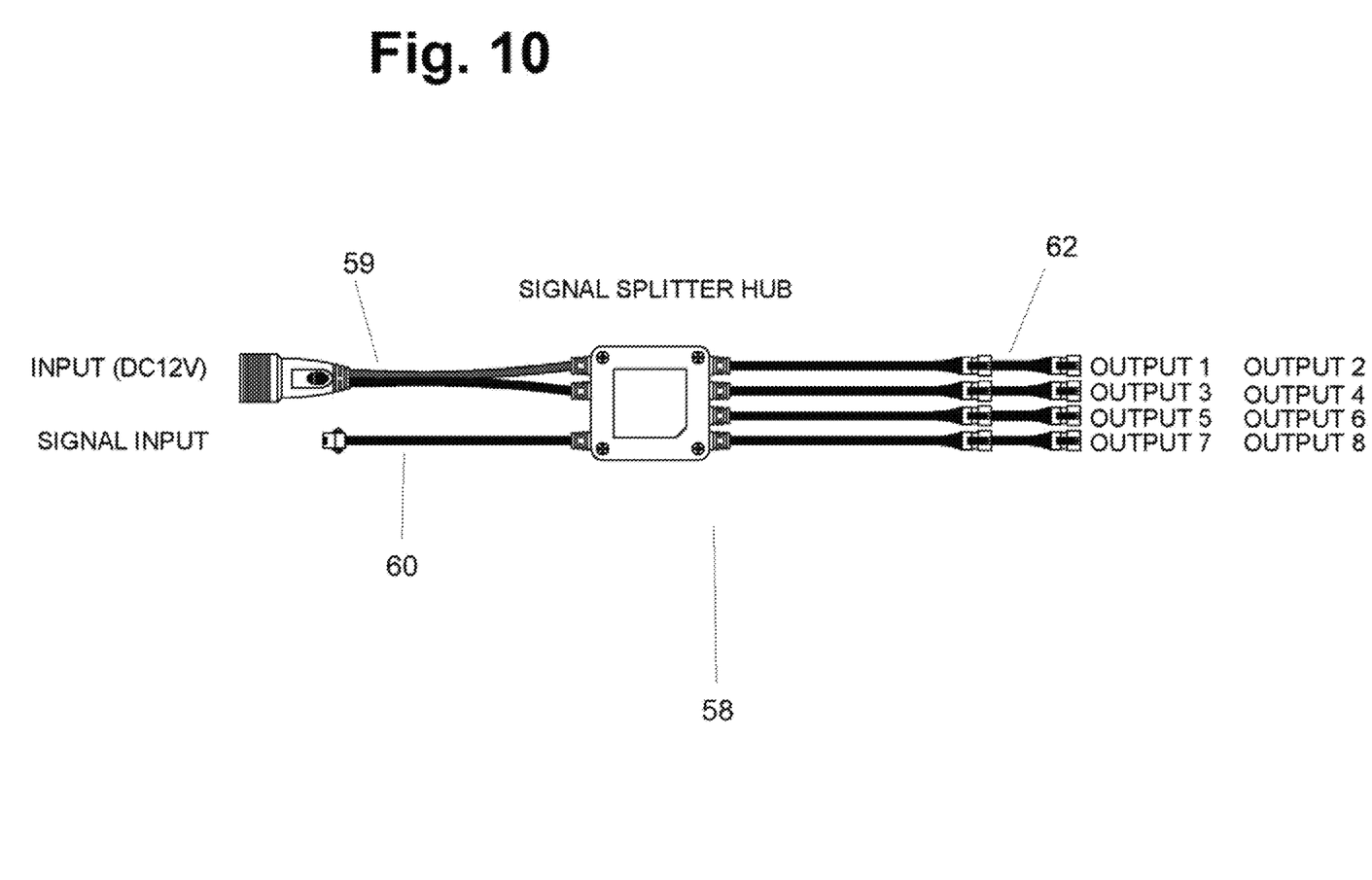
FIG. 10 is a diagram of an embodiment of a signal splitter hub.
Figure 11:
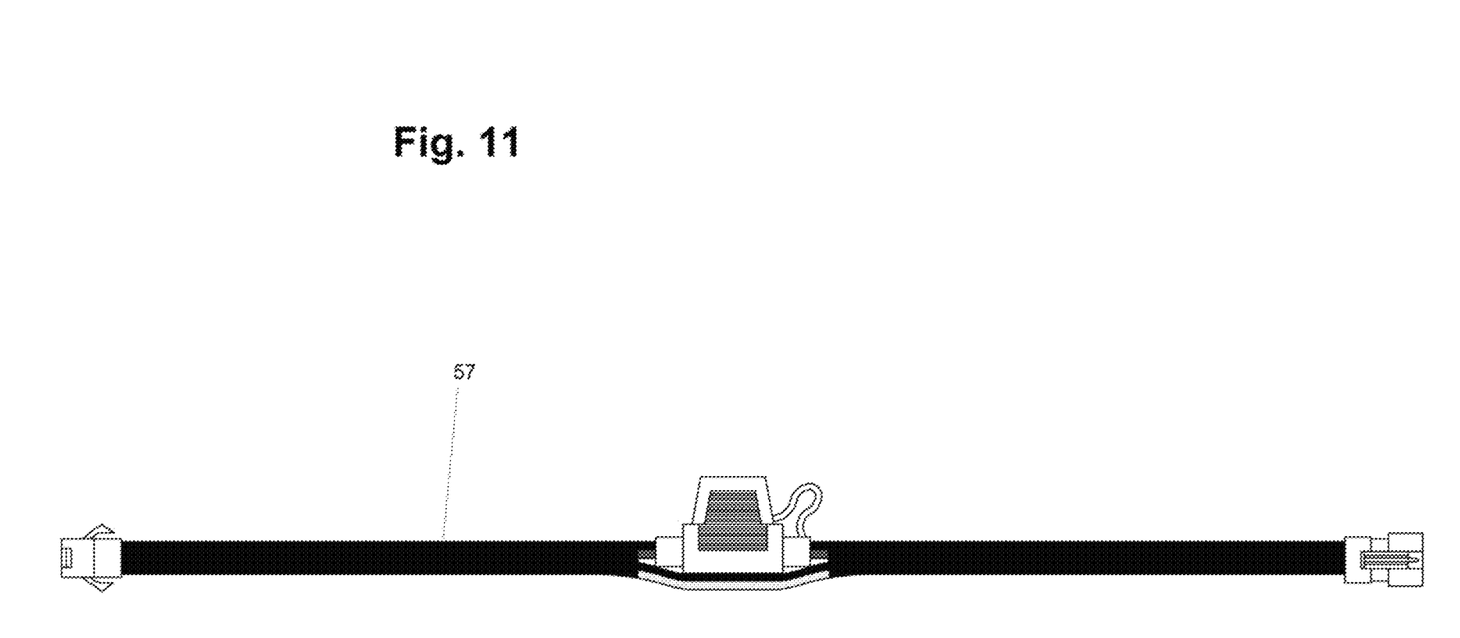
FIG. 11 is a diagram of an embodiment of a fuse adaptor.
Figure 12:
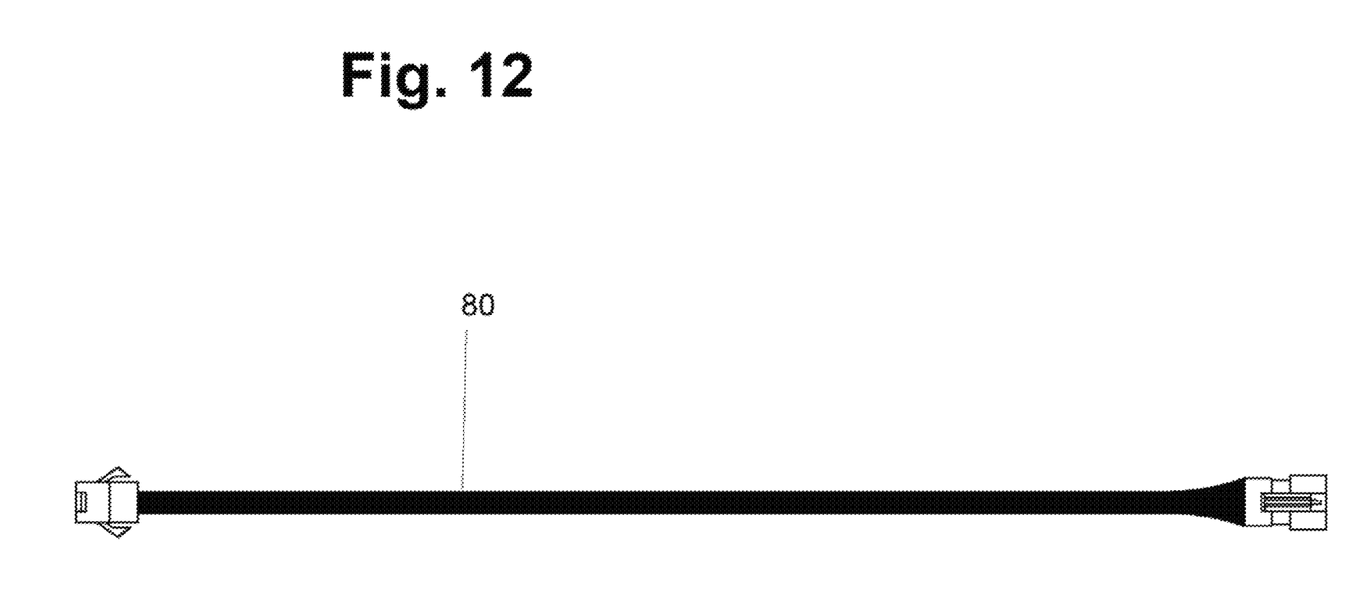
FIG. 12 is a diagram of an embodiment of an extension cable.
Figure 14:
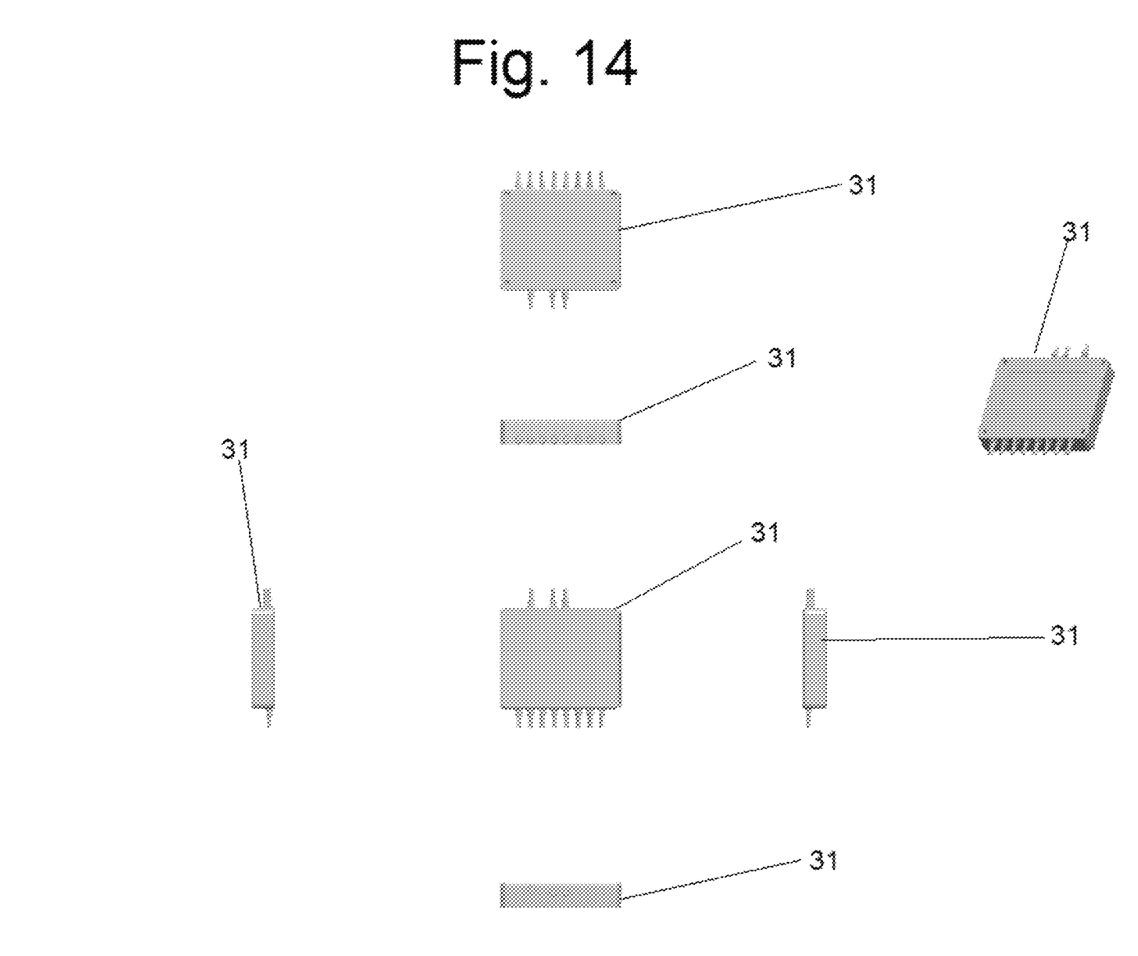
FIG. 14 is a plurality of views of the housing for an embodiment of the eight-zone controller
Figure 15:
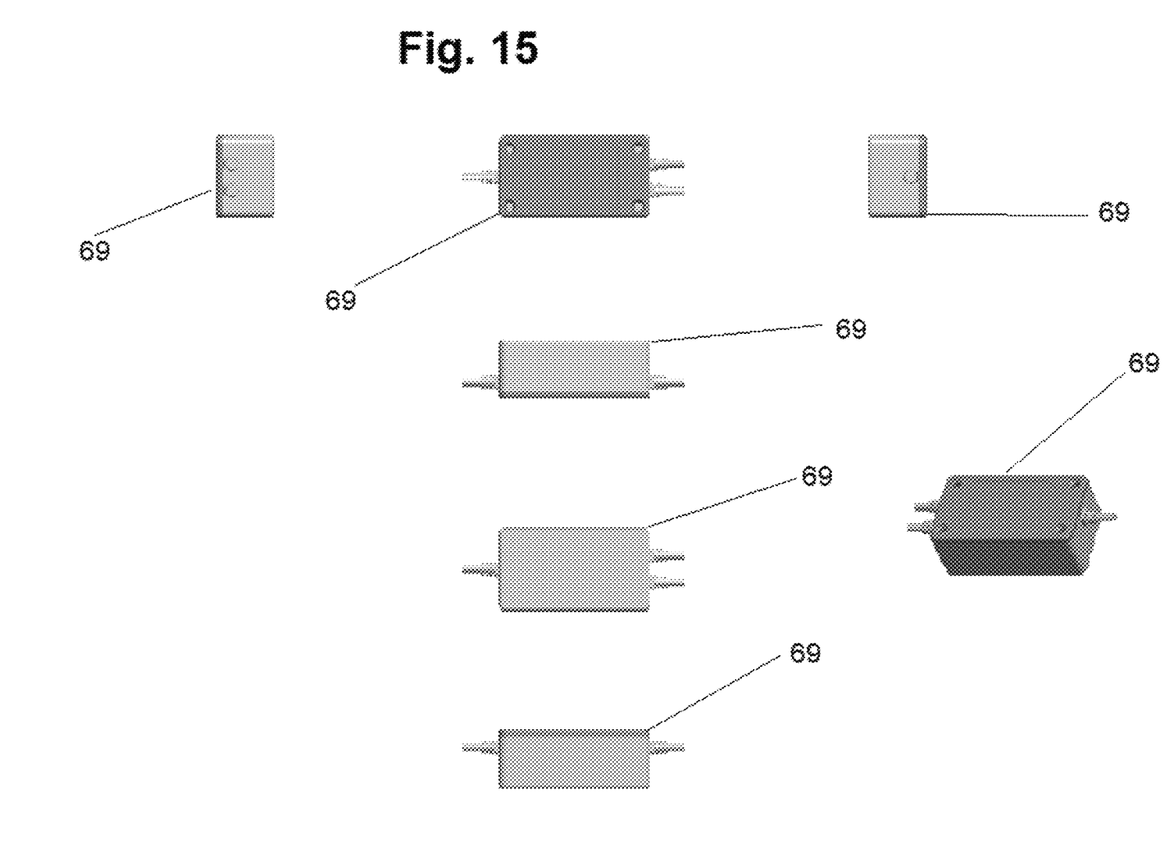
FIG. 15 is a plurality of views of an embodiment of the exterior housing for voltage transformer and signal relay.
Figure 16:
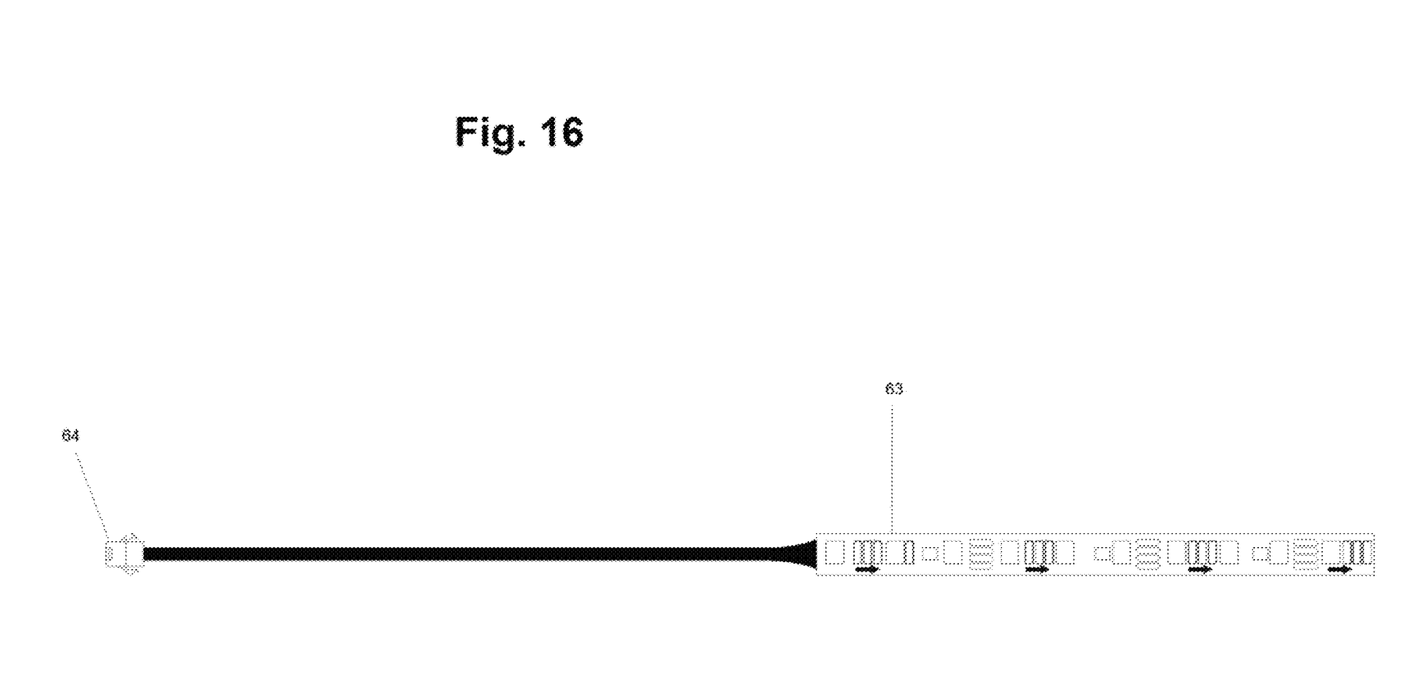
FIG. 16 is a diagram of an embodiment of an LED light strip.

With reference to FIG. 10, a splitter hub 58 comprises a power input 59, a LED signal input 60, a housing 61, and a plurality of outputs 62. In the embodiment shown in the Figures, the splitter hub 58 contains one LED signal input 60 and eight outputs 62. A splitter hub 58 does not function independently. The splitter hub 58 receives and relays signals. It does not generate signals. The splitter hub 58 splits one signal into eight outputs of the same signal. The output of all eight signal splitter outputs will be the same as the signal input.

Figure 3:
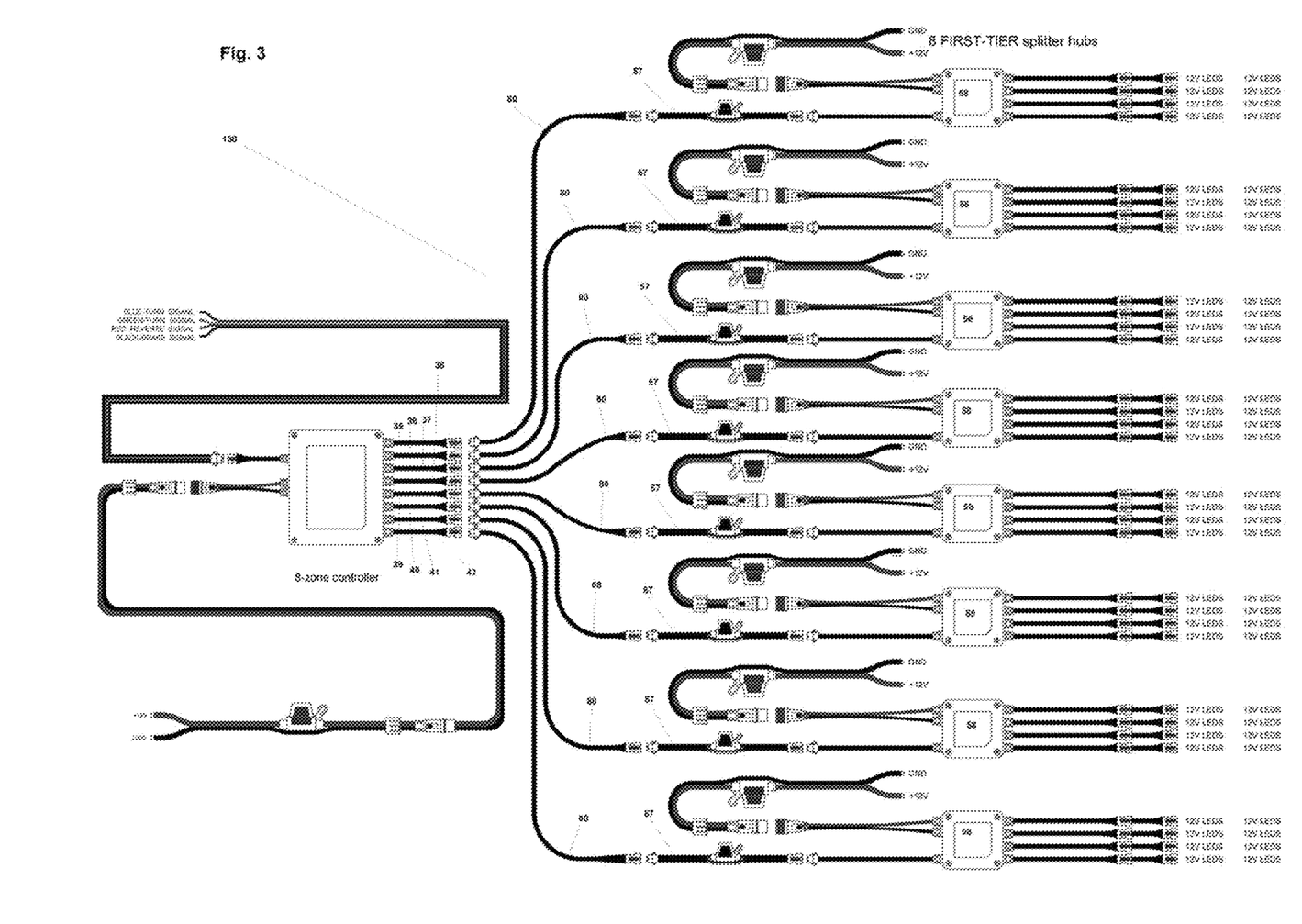
FIG. 3 a diagram of an embodiment of the eight-zone controller configured with up to sixty-four LED lights.

With reference to FIG. 3, an embodiment 130 of the eight-zone controller 30 is shown implemented with eight splitter hubs 58. Output zone one 35 is connected, via an extension cord 80 and a fuse adaptor 57 to a first splitter hub 58. Output zone two 36 is connected, via an extension cord 80 and a fuse adaptor 57 to a second splitter hub 58. Output zone three 37 is connected, via an extension cord 80 and a fuse adaptor 57, to a third splitter hub 58. Output zone four 38 is connected, via an extension cord 80 and a fuse adaptor 57, to a fourth splitter hub 58. Output zone five 39 is connected, via an extension cord 80 and a fuse adaptor 57, to a fifth splitter hub 58. Output zone six 40 is connected, via an extension cord 80 and a fuse adaptor 57, to a sixth splitter hub 58. Output zone seven 41 is connected, via an extension cord 80 and a fuse adaptor 57, to a seventh splitter hub 58. Output zone eight 42 is connected, via an extension cord 80 and a fuse adaptor 57, to an eighth splitter hub 58.

In this embodiment 130, up to sixty-four LED lights 63 can be connected to and controlled by the eight-zone controller 30. Each of the eight-zone outputs 34 of the eight-zone controller 30 connect to a splitter hub 58. Each of the eight outputs 62 of each splitter hub 58 connect to the input coupler of a light 63.

Figure 4:
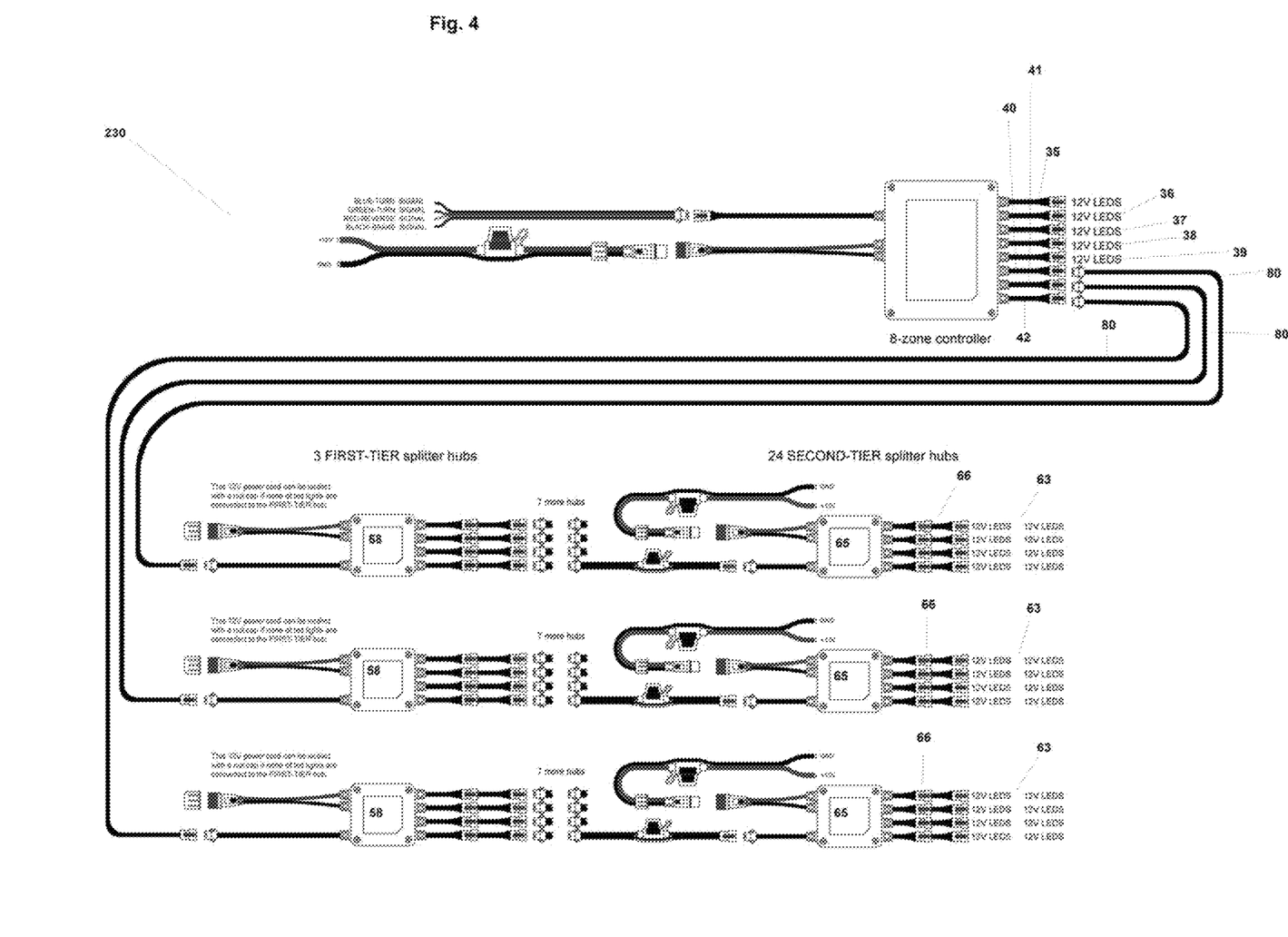
FIG. 4 is a diagram of an embodiment of the eight-zone controller configured with up to one-hundred-ninety-seven LED lights.

With reference to FIG. 4, an embodiment 230 of the eight-zone controller 30 is shown. Output zone one 35 is connected to a light 63 for turn function activated via the blue turn signal trigger wire 53. Output zone two 36 is connected to a light 63 for turn function activated via the green turn signal trigger wire 54. Output zone three 37 is connected to a light 63 for brake function activated via the black brake signal trigger wire 56. Output zone four 38 is connected to a light 63. Output zone five 39 is connected to a light 63 for reverse function activated via the red reverse signal trigger wire 55. Output zones six 40, seven 41, and eight 42 are connected to splitter hubs 58. Each output 62 of each splitter hub 58 is connected to a second-tier splitter hub 65 (the second-tier splitter hubs 65 are mechanically the same as the splitter hubs 58. The nomenclature "second tier" is being used to indicate the splitter hub is the second in a sequence of splitter hubs.). Each second-tier splitter hub 65 comprises a plurality of second tier splitter outputs 66. In the embodiment shown in the Figures, each second-tier splitter up has eight outputs 66. Each second-tier hub splitter outlet 66 is connected to a light 63.

Figure 5:
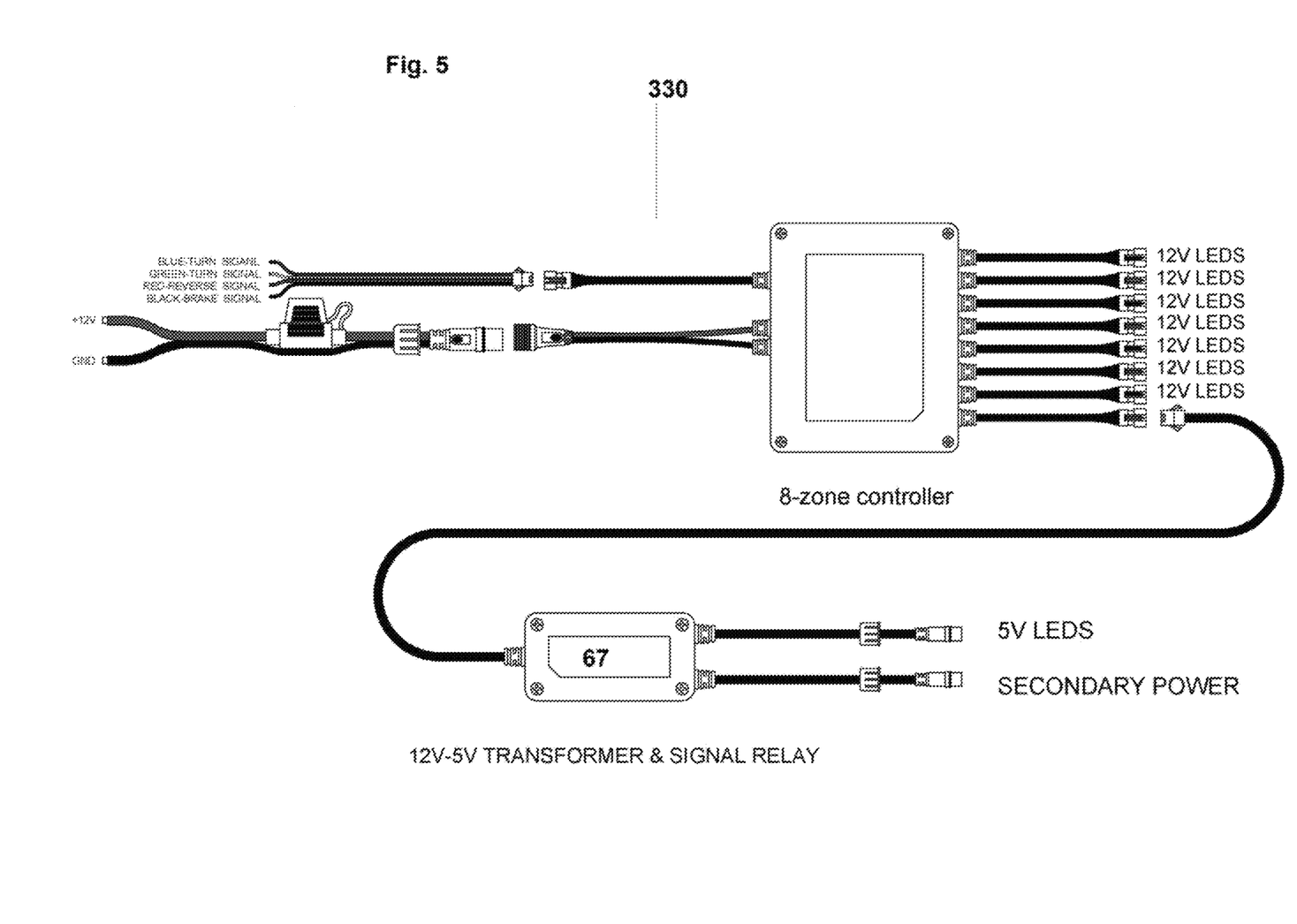
FIG. 5 is a diagram of an embodiment of the eight-zone controller configured with a transformer with a signal relay.
Figure 9:
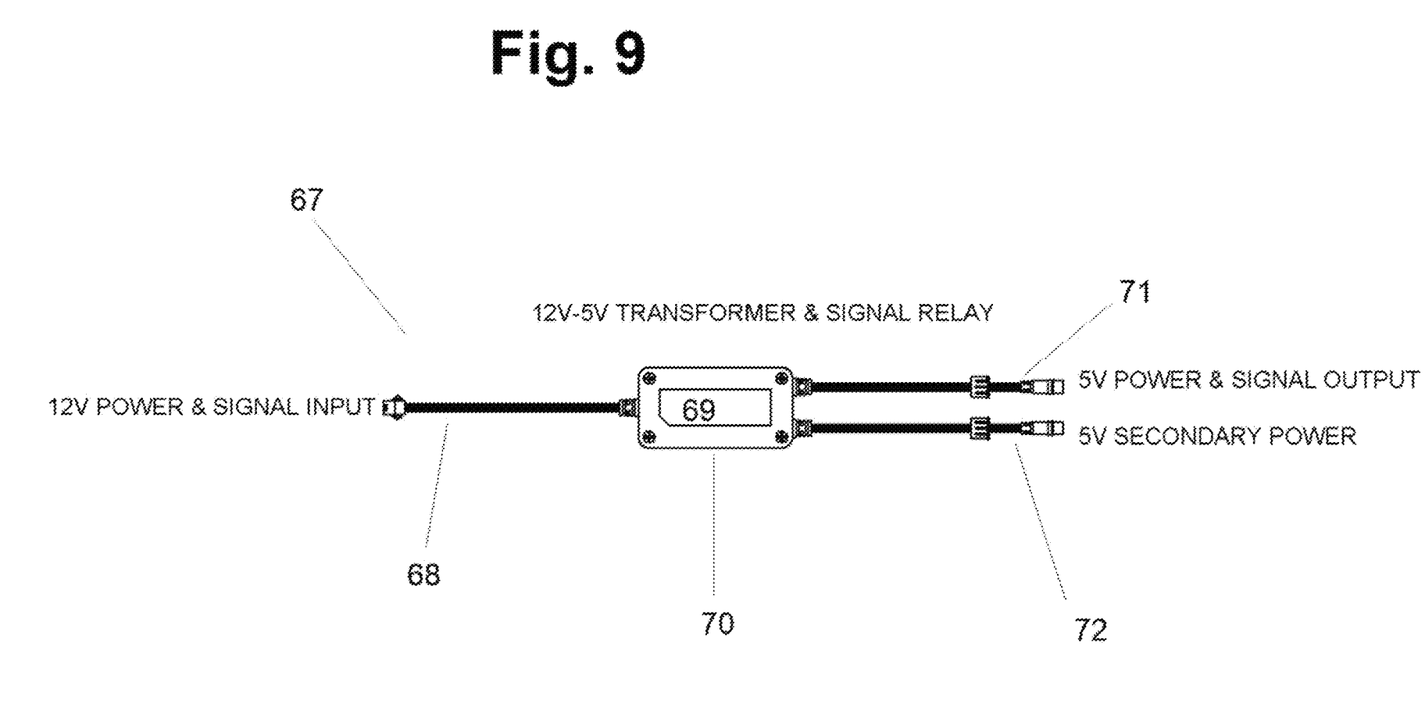
FIG. 9 is a diagram of an embodiment of a voltage transformer and signal relay.

With reference to FIG. 5, an embodiment 330 of the eight-zone controller is shown which can accommodate a mixture of twelve-volt and five-volt lights. The embodiment 330 is set up similar to the embodiment described supra. Output zones one 35 two 36, three 37, four 38, five 39, six 40, and seven 41 are connected to lights 63. Output zone eight 42 is connected to a voltage transformer with a signal relay 67. With further reference to FIG. 9, the voltage transformer with a signal relay comprises a twelve-volt power and signal input 68, a housing 69, a transformer with signal relay 70 within said housing, a five-volt power and signal output 71, and a five-volt secondary power output 72.

Figure 6:
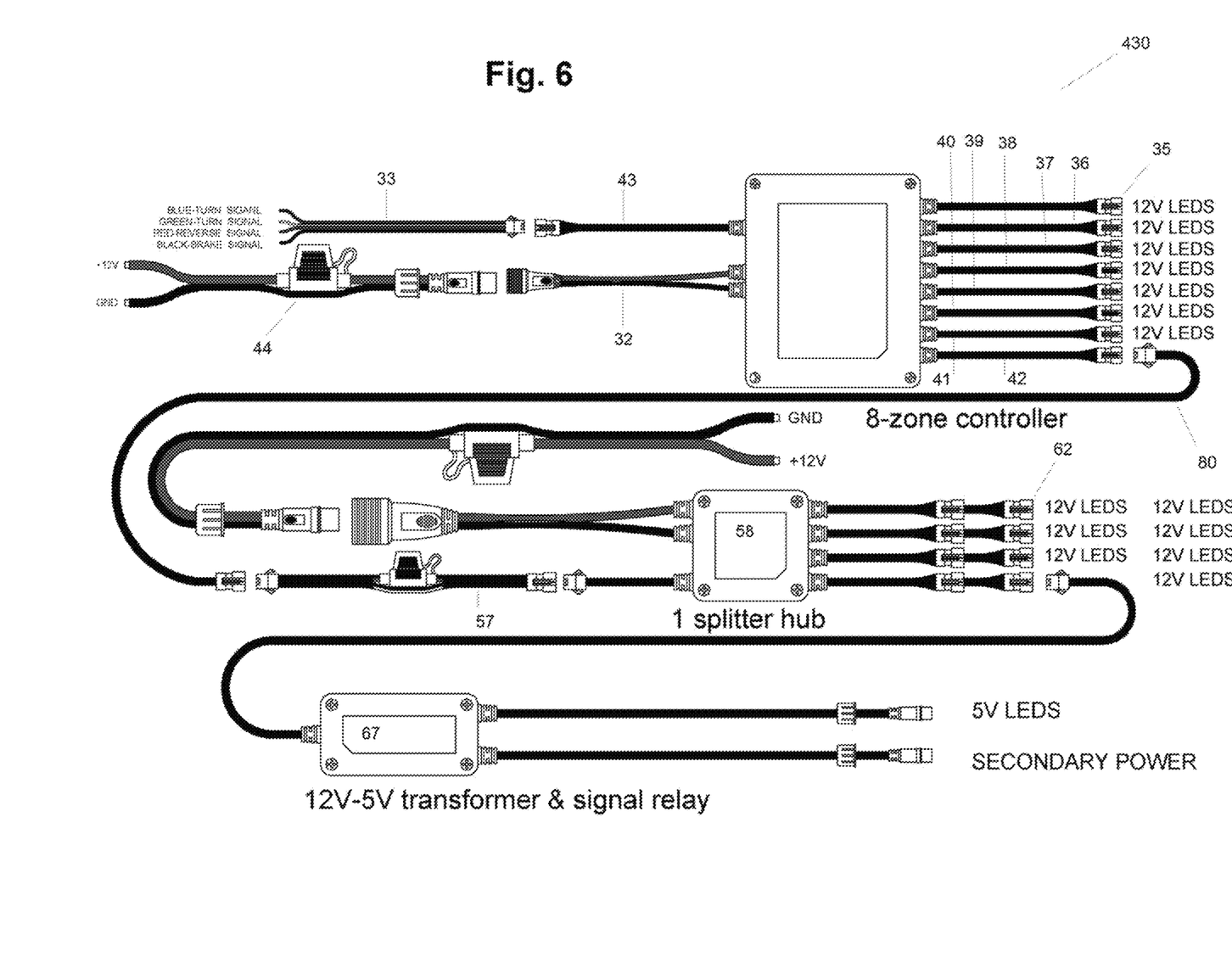
FIG. 6 a diagram of an embodiment of the eight-zone controller configured with a splitter hub and a transformer with a signal relay.

With reference to FIG. 6, an embodiment 430 of the eight-zone controller is shown which implements a mixture of twelve-volt and five-volt lights. The embodiment 430 is set up similar to embodiment 330 described in the preceding paragraph. Output zones one 35 two 36, three 37, four 38, five 39, six 40, and seven 41 are connected to lights 63. Output zone eight 42 is connected via an extension cord 80 and a fuse adapter 57 to a splitter hub 58. Seven of the eight splitter hub 58 outputs 62 are connected to lights 63. One of the eight splitter hub 58 outputs 62 is connected to a voltage transformer 67.

Figure 7:
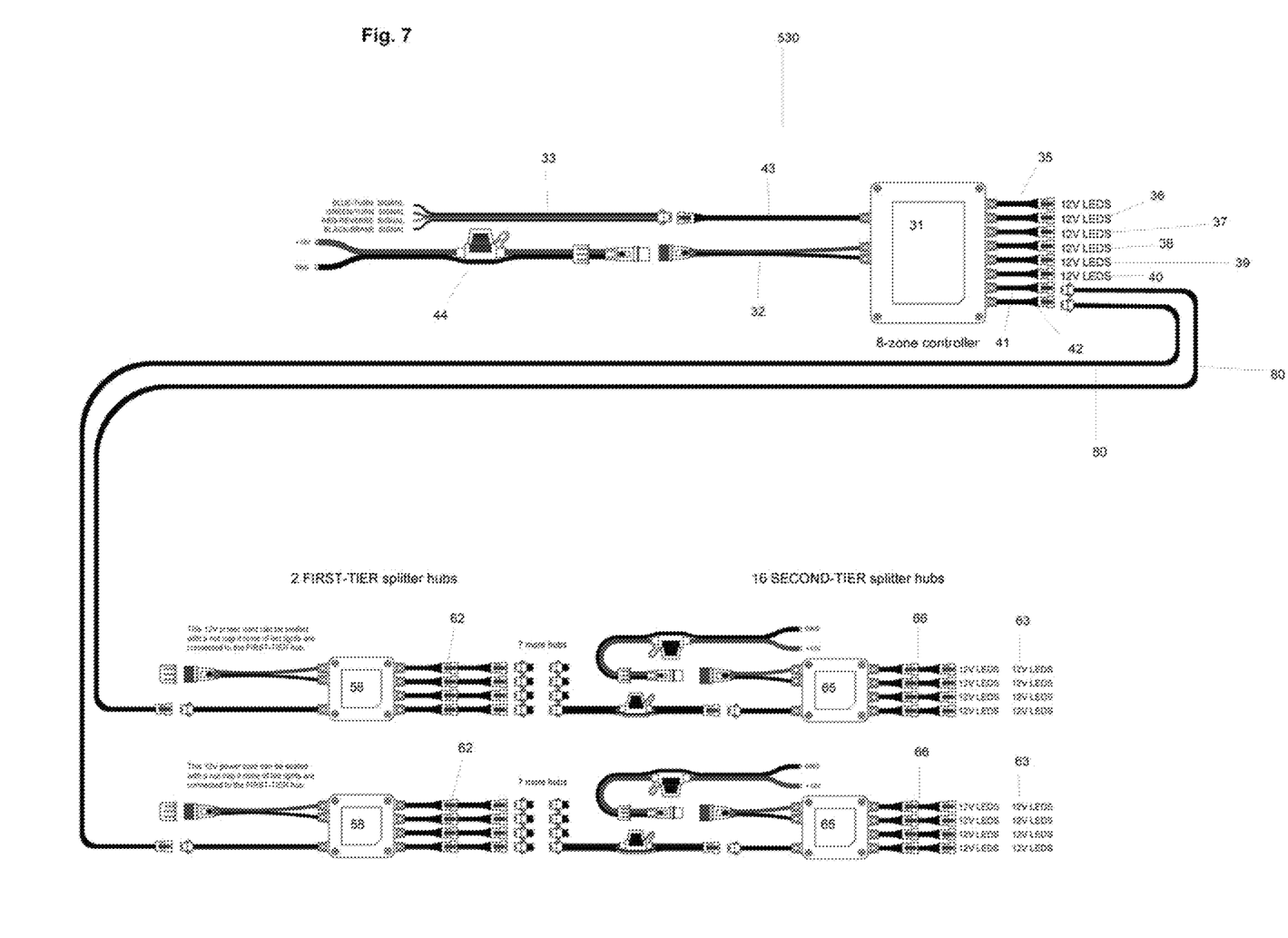
FIG. 7 is diagram of an embodiment of the eight-zone controller configured with up to one-hundred-thirty-four LED lights.

With reference to FIG. 7, an embodiment 530 of the eight-zone controller is shown. Zone one 35 connects to a light 63 for turn function activated via the blue turn signal wire 53. Zone two 36 connects to a light 63 for turn function activated via the green turn signal wire 54. Zone three connects to a light 63 for brake function activated via the black brake signal wire 56. Zone four 38 connects to a light 63. Zone five 39 connects to a light 63 for reverse function activated via the red reverse signal wire 55. Zone six 40 connects to a light 63. Zone seven 41 connects to a splitter hub 58 located near the front of the vehicle. The outputs 62 of the splitter hub 58 near the front of the vehicle are connected to up to eight second tier splitter hubs 65. The second-tier splitter hub 65 outputs 66 are connected to lights 63. Zone eight 42 connects to a splitter hub 58 locate near the rear of the vehicle. The outputs 62 of the splitter hub 58 near the rear of the vehicle are connected to up to eight second tier splitter hubs 65. The outputs of the rear second tier splitter hubs are connected to lights 63.

When additional power to a splitter hub 58 is unnecessary because no LED lights are connected to the splitter hub, the splitter hub power input 59 can be sealed with a nutcap.

The eight-zone controller 30 describe herein are capable of maintain eight separate zones of control. This allows the user to separately control the different zones. For example, the user could direct only one zone to be lit. Each zone can output a distinct signal. Besides, the user can group two or more zones together.

Those skilled in the art understand that different nomenclature can be used to describe the eight-zone controller without changing the substance of the technology. Those skilled in the art further understand that the eight-zone controller has been described with regard to particular embodiments, but variations of the eight-zone controller are understood by the inventor and the eight-zone controller could be used with a different series of components and with different numbers of lights.

I claim:

1. A light system for a vehicle comprising:
a controller, a housing, a power supply, a plurality of lights, and a plurality of output zones;
said plurality of output zones further comprising a first output zone, a second output zone, a third output zone, a fourth output zone, a fifth output zone, a sixth output zone, a seventh output zone, and an eighth output zone;
a splitter hub;
wherein said splitter hub comprises a power supply, a signal input, a housing, and eight signal outputs.

2. A light system for a vehicle comprising:
a controller, a housing, a power supply, a plurality of lights, and a plurality of output zones;
said plurality of output zones further comprising a first output zone, a second output zone, a third output zone, a fourth output zone, a fifth output zone, a sixth output zone, a seventh output zone, and an eighth output zone;
a voltage transformer with a signal relay;
wherein said voltage transformer and signal relay comprises a twelve-volt power with a signal input, a housing, a five-volt power and signal output and a five-volt secondary power outlet.

3. A light system for a vehicle comprising:
a controller, a housing, a power supply, and a trigger signal supply;
wherein said controller includes eight output zones;
wherein each output zone of the controller is connected to a splitter hub, each splitter hub having eight outputs, each splitter hub outlet connected to a light.

* * * * *